(12) United States Patent
Shirai

(10) Patent No.: US 6,247,846 B1
(45) Date of Patent: Jun. 19, 2001

(54) ROLLING ELEMENT AND RECTILINEARLY-MOVABLE APPARATUS USING THE ROLLING ELEMENT

(75) Inventor: Takeki Shirai, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/488,532

(22) Filed: Jan. 21, 2000

(30) Foreign Application Priority Data

Jan. 29, 1999 (JP) .................................................. 11-022476

(51) Int. Cl.$^7$ ............................ F16C 33/56; F16H 55/17
(52) U.S. Cl. ............................ 384/45; 74/424.88; 384/51
(58) Field of Search .................................. 384/45, 43, 51, 384/520; 74/424.88

(56) References Cited

U.S. PATENT DOCUMENTS

| | | | |
|---|---|---|---|
| 5,988,883 | * 11/1999 | Takamatu et al. | 384/45 |
| 5,993,064 | * 11/1999 | Teramachi et al. | 384/43 |
| 6,070,479 | * 6/2000 | Shirai | 74/424.88 |
| 6,082,210 | * 7/2000 | Ise | 74/424.83 |
| 6,102,572 | * 8/2000 | Hidano | 384/45 |
| 6,116,783 | * 9/2000 | Shirai et al. | 384/43 |
| 6,152,602 | * 11/2000 | Honma et al. | 384/45 |
| 6,155,718 | * 12/2000 | Takamatsu et al. | 384/45 |

* cited by examiner

*Primary Examiner*—Thomas R. Hannon
(74) *Attorney, Agent, or Firm*—Morgan, Lewis & Bockius LLP

(57) ABSTRACT

A rolling-element hold spacer 9 includes a spherical indent 11 which is formed in either side of a rolling element 7 so as to match the curved surface of the rolling element 7; thick hold sections 10a, 10b to be interposed between the rolling elements 7; and thin bent sections 12 for interconnecting only one thick hold section pair 10a, 10b in which the rolling element 7 is to be interposed. The thin bent section 12 is deflected or twisted in a curved portion of a rolling-element circulation path. Further, the rolling-element hold spacers which are adjacent to each other with a single rolling element interposed therebetween mutually perform pivotal movement around the rolling element 7, thereby enabling smooth circulation of the rolling elements 7. Clearance arises between the rolling element 7 and the thick hold sections 10a, 10b as a result of bent of the thin bent section 12. Lubricant enters the clearance, to thereby sufficiently lubricate the rolling elements 7. So long as the rolling-element hold spacer 9 is placed every other the rolling elements 7, all the rolling elements 7 are eventually held by the rolling-element hold spacers 9. Consequently, the number of rolling-element hold spacers 9 can be reduced to one-half the number of the rolling elements 7, and the number of rolling elements 7 can be increased correspondingly.

6 Claims, 14 Drawing Sheets

MOVING DIRECTION

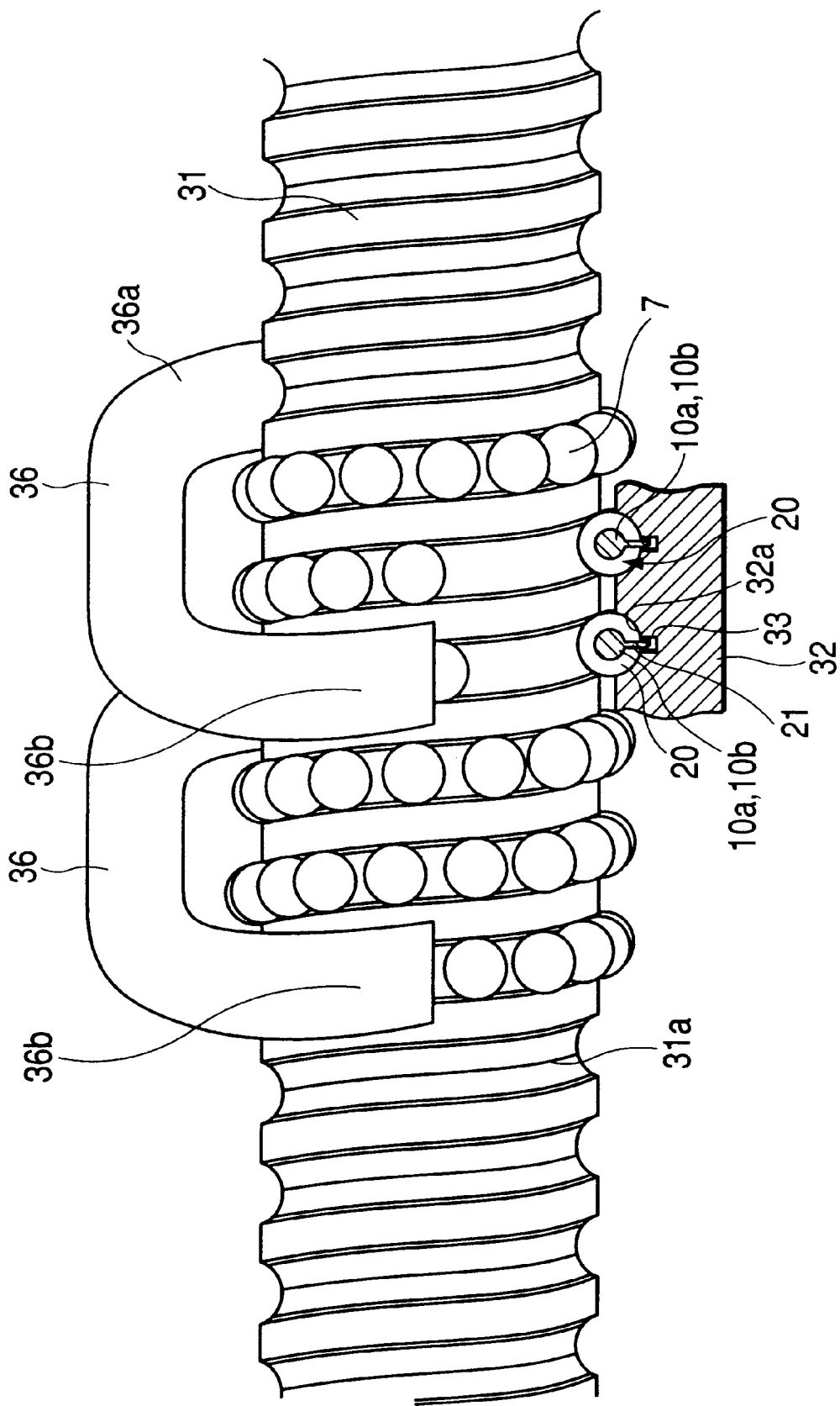

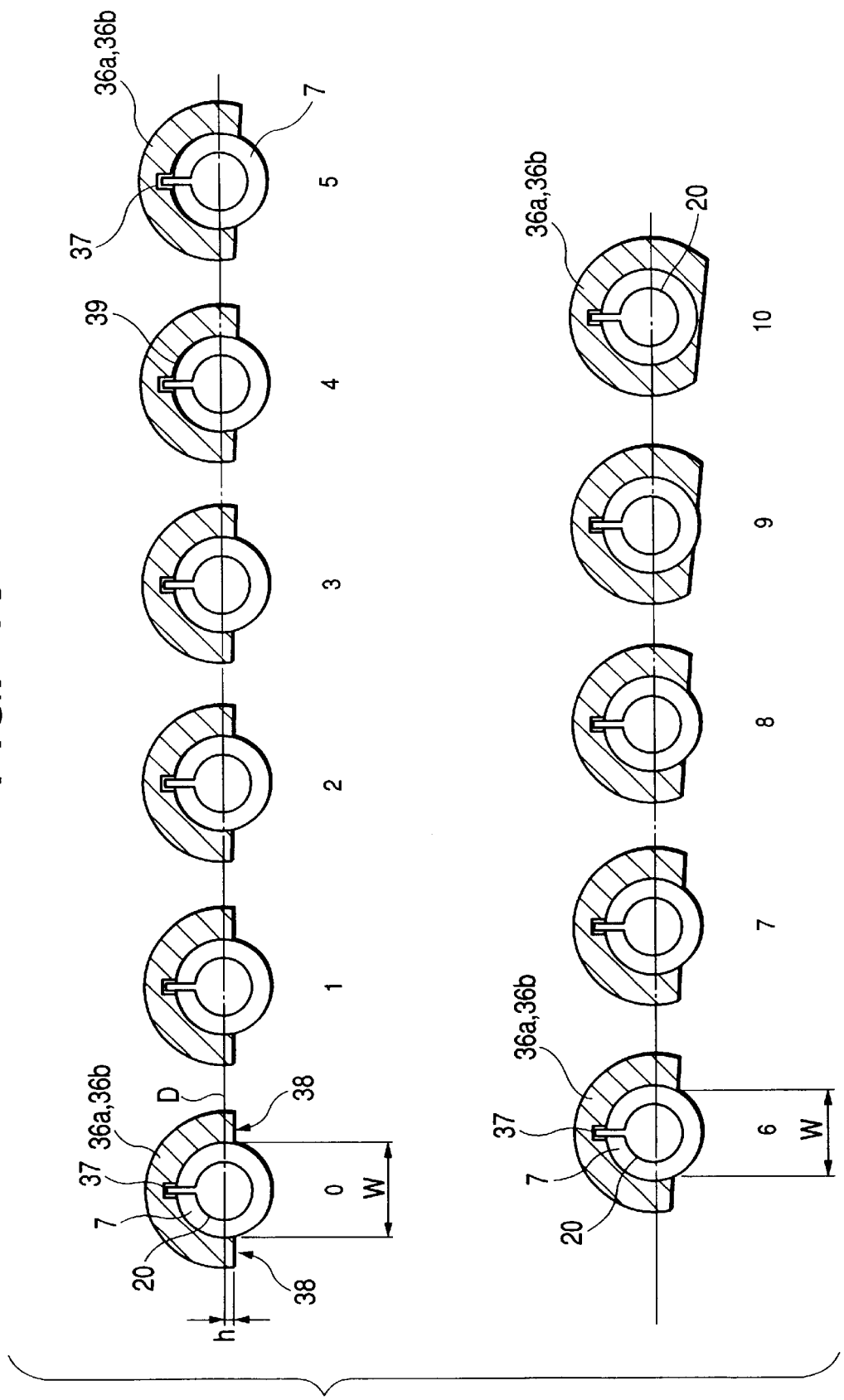

ROLLING ELEMENT AND RECTILINEARLY-MOVABLE APPARATUS USING THE ROLLING ELEMENT

BACKGROUND OF THE INVENTION

1. Field of the Invention

The present invention relates to a rolling-element hold spacer for retaining, in a rotatable and slidable manner, rolling elements used in a rectilinearly-movable apparatus, such as a rectilinearly-rolling guide apparatus, a ball screw, and a ball spline, as well as a rectilinearly-movable apparatus using the rolling element hold spacer.

2. Description of the Related Art

As shown in FIG. 15, a single-element retainer 2 for individually holding a ball 1 has already been known as a rolling-element hold spacer for a holding ball (corresponding to a rolling element) used in a rectilinearly-movable apparatus (see, for example, Japanese Patent Publication No. 33774/1993). The ball 1 is held, in a rotatable and slidable manner, within a housing hole 2a formed in the single-element retainer 2 while the upper and lower portions of the ball 1 are partially exposed. The single-element retainer 2 is incorporated in the rectilinearly-movable apparatus. A fittingly-insert section 2b is bulgily formed in the single-element retainer,2 on either side of the ball 1 and is to be inserted into a guide channel formed in a slide member. The single-element retainers 2, each housing the ball 1, are inserted in a circulation path of the slide member. The single-element retainers 2 travel in the direction designated by A shown in the drawing. The opposite ends of the single-element retainer 2, which come into contact with the corresponding ends of the adjoining single-element retainers 2 while the single-element retainers 2 are traveling along the circulation path, are formed so as to assume a circular-arc shape 2c. The distance between the centers of the adjacent balls 1 is maintained constantly. Since the balls 1 are arranged and held in a circulation path while being held by the respective single-element retainers 2, the balls 1 are prevented from rubbing against each other during circulation, thus preventing generation of a collision sound or abrasion, which would otherwise be caused by rubbing action.

Such a known single-element retainer 2 is suitable for being arranged and housed in the circulation path of the rectilinearly-rolling guide apparatus, as well as for effecting two-dimensional change between linear travel direction A and U-shaped travel direction B, as shown in FIG. 15. However, there may be a case where a ball screw requires three-dimensional change of direction and torsional movement with respect to a travel direction, as well as two-dimensional change of direction. The single-element retainer 2 is difficult to effect such complicated movements. Further, the circumference of the ball 1 exclusive the upper and lower portions thereof is covered with the single-element retainer 2. It is difficult for a lubricant to enter the space between the single-element retainer 2 and the ball,thus insufficiently lubricating the ball 1. Further, since one single-element retainer 2 is used for holding a single ball 1, space for the circular-arc portions 2c of the adjacent single-element retainers 2 must be ensured between the adjacent balls 1. For this reason, the single-element retainers 2 occupy space within the circulation path, thus imposing a limitation on the number of balls 1 to be inserted into the circulation path. Therefore, the rectilinearly-rolling guide apparatus cannot assume a large load-carrying capacity. The portion of the single-element retainer 2 which comes into contact with the corresponding portion of the adjacent single-element retainer 2 assumes a circular-arc protrudent shape 2c, and hence the adjacent single-element retainers 2 come into substantial line contact with each other, thus increasing a contact pressure. Consequently, there is a case where the single-element retainers 2 repeatedly come into collision with each other during the course of circulating operation, thus causing a collision sound. Further, the single-element retainer 2 has the bulgily-formed fittingly-insert sections 2b and hence has an irregular thickness with respect to the circulating direction of the single-element retainer 2 (i.e., direction A). Therefore, the single-element retainers 2 may cause pitching during a circulating operation.

SUMMARY OF THE INVENTION

Accordingly, the present invention is aimed at providing a rolling-element hold spacer which ensures smooth Circulating operation even in the case of a complicated movement mode such as that effected in a three-dimensional change-of-direction path and which can increase the load-carrying capacity of a rectilinearly-movable apparatus by means of increasing the number of rolling elements inserted in a circulation path.

Also, the present invention is aimed at providing a rectilinearly-movable apparatus equipped with the rolling element hold spacer.

To achieve the above objects, according to a first aspect of the invention, there is provided a rolling-element hold spacer comprising:

a thick hold section having spherical indents formed on both sides thereof, said thick hold sections being adapted to be interposed between rolling elements so that the spherical indents match the curved surface of the rolling elements; and thin bent sections for interconnecting only one thick hold section pair in which the rolling element is to be interposed.

In the first aspect of the present invention, the thin bent section is deflected or twisted in a curved portion of a rolling-element circulation path. Further, the rolling-element hold spacers which are adjacent to each other with a single rolling element interposed therebetween mutually perform pivotal movement around the rolling element, thereby enabling smooth circulation of the rolling elements. Clearance arises between the rolling element and the thick hold sections as a result of bent of the thin bent section. Lubricant enters the clearance, to thereby sufficiently lubricate the rolling elements. So long as the rolling-element hold spacer is placed every other the rolling elements, all the rolling elements are eventually held by the rolling-element hold spacers. Consequently, the number of rolling-element hold spacers can be reduced to one-half the number of the rolling elements.

More specifically, the number of rolling-element hold spacers to be inserted into the rolling-element circulation path is reduced, and the number of rolling element can be increased correspondingly. As a result, the load-carrying capacity of a rectilinearly-movable apparatus employing the rolling-element hold spacers can be increased. Further, the thick hold sections of the rolling-element hold spacer hold the rolling element by way of the spherical indents, and hence a contact pressure developing between the rolling-element hold spacer and the rolling element can be diminished. Accordingly, there can be prevented generation of a collision sound, which would arise during the circulation of the rolling elements, thus enabling smooth circulation of the rolling elements. The thin bent section interconnecting the thick hold sections has a strip shape and a uniform thickness in the traveling direction of the rolling-element hold spacer. So long as the width of a guide groove formed in the slide member for the purpose of guiding the thin bent section is set to be slightly greater than the thickness of the thin bent section, the rolling-element hold spacer is stably guided without involvement of a pitching problem, thus ensuring smooth circulation of the rolling elements.

Preferably, the thin bent section is provided on either side of the rolling element.

By means of such a configuration of the present invention, the thin bent section provided on either side of the rolling element stably holds the rolling element, thus prolonging the life of the rolling-element hold spacer.

Preferably, the thin bent section is provided only on one side of the rolling element.

By means of such a configuration of the present invention, even when the rolling elements are circulated through a warped circulation path, the thin bent section can be freely deflected so as to match the warped path. Therefore, the rolling elements can be smoothly circulated in the circulation path.

Also, according to a second aspect of the invention, there is provided a rectilinearly-movable apparatus comprising:

a track shaft having rolling-element travel surfaces;

a slide member having load travel surfaces corresponding to the rolling-element travel surfaces and attached to said track shaft so as to freely perform movement relative thereto;

a plurality of rolling elements arranged and housed in the rolling-element travel circulation path and are circulated in association with the movement of said slide member relative to said track shaft; and a plurality of rolling-element hold spacers, each of which rotatively holds each of the rolling elements;

wherein said rolling-element hold spacer comprises a thick hold section having spherical indents formed on both sides thereof, said thick hold sections being adapted to be interposed between rolling elements so that the spherical indents match the curved surface of the rolling elements; and thin bent sections for interconnecting only one thick hold section pair in which the rolling element is to be interposed.

As mentioned above, in the present invention, so long as the rolling-element hold spacer is placed every other the rolling elements, all the rolling elements are eventually held by the rolling-element hold spacers. Consequently, the number of rolling-element hold spacers can be reduced to one-half the number of the rolling elements. More specifically, the number of rolling-element hold spacers to be inserted into the rolling-element circulation path is reduced, and the number of rolling-elements can be increased correspondingly. As a result, the load-carrying capacity of a rectilinearly-movable apparatus employing the rolling-element hold spacers can be increased. Further, particularly in a warped portion of the rolling-element circulation path, the thin bent section is deflected, thus making smooth circulation of the rolling elements. Clearance is arises between the rolling element and the thick hold sections as a result of bent of the thin bent section. Lubricant enters the clearance, to thereby sufficiently lubricate the rolling elements.

BRIEF DESCRIPTION OF THE DRAWINGS

FIGS. 2A to 2C show a ball hold spacer of the first embodiment, wherein FIG. 2A is a perspective view showing the ball hold spacer, FIG. 2B is a side view showing the same, and FIG. 2C is a plan view showing the same;

FIGS. 3A to 3C show the rectilinearly-rolling guide apparatus, wherein FIG. 3A is a cross-sectional view taken in the direction perpendicular to the axial direction of a rail and FIGS. 3B and 3C are enlarged views showing a load travel path;

FIGS. 5A and 5B show a ball hold spacer according to a second embodiment of the present invention, wherein FIG. 5A is a perspective view showing the ball hold spacer and FIG. 5B is a plan view showing the same;

FIGS. 6A to 6C show a rectilinearly-rolling guide apparatus having incorporated therein the ball hold spacer of the second embodiment, wherein FIG. 6A is a cross-sectional view taken in the direction perpendicular to the axial direction of the rail and FIGS. 6B and 6C are enlarged views showing a load travel channel;

FIG. 9 is a side view showing a return pipe, a screw shaft, and balls, which correspond to the principal elements of the balls screw shown in FIG. 7;

FIG. 10 is an operation diagram showing raising of a ball within the return pipe shown in FIG. 8;

FIGS. 11A and 11B show the movement of the ball hold spacer when the ball hold spacer changes direction, wherein FIG. 11A is a perspective view showing a deflected state of a thin bent section and FIG. 11B is a perspective view showing mutual pivotal movement arising between the ball hold spacers;

DETAILED DESCRIPTION OF THE PREFERRED EMBODIMENTS

Now, a description will be given in more detail of preferred embodiments of the present invention with reference to the accompanying drawings.

Figure 1:
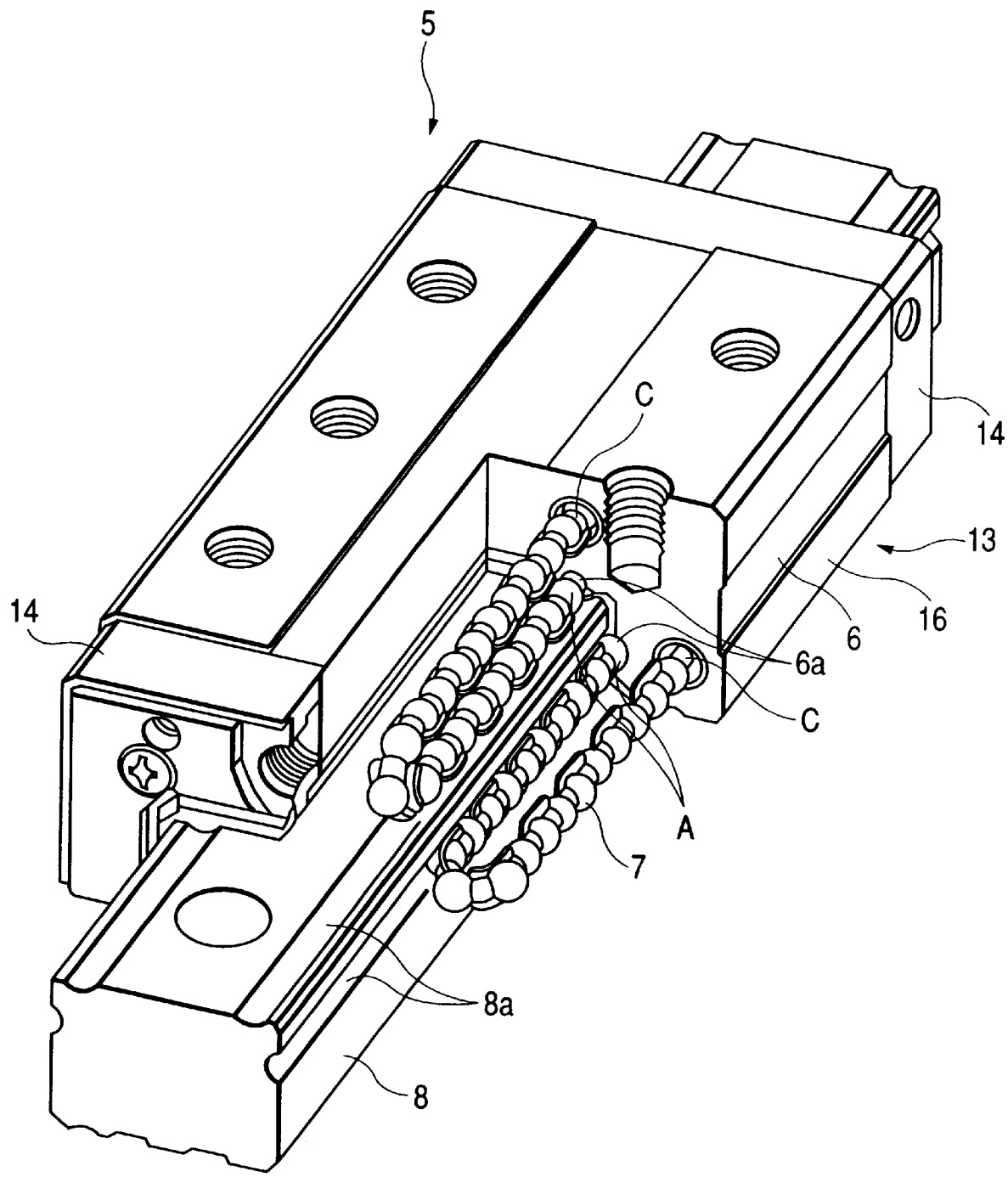
FIG. 1 is a perspective view showing a rectilinearly-rolling guide apparatus having incorporated therein a ball hold spacer according to a first embodiment of the present invention.

FIG. 1 shows a rectilinearly-rolling guide apparatus 5 incorporating a ball-retaining spacer as a rolling-element hold spacer according to a first embodiment of the present invention. The rectilinearly-rolling guide apparatus 5 guides a movable member, such as a table, on a stationary section, such as a bed or a saddle. The rectilinearly-rolling guide apparatus 5 is placed on the stationary section and includes a guide rail 8 (serving as a "track spindle"); a movable block (slide member) 6; and a plurality of balls 7. Ball travel grooves 8a, each serving as a ball rolling surface, are formed in the guide rail 8 in the longitudinal direction thereof. A ball circulation path (i.e., a rolling-element circulation path) including load travel grooves 6a, which serve as load rolling surfaces and correspond to the respective ball travel grooves 8a of the guide rail 8, is formed in the movable block 6. The movable block 6 is also attached to the guide rail 8 so as to cause relative movement with respect to the guide rail 8. The balls 7 serve as rolling elements which are to be arranged and housed within the ball circulation path and which are circulated in association with the movement of the movable block 6 relative to the guide rail 8. In association with infinite circulation of the balls 7, the movable block 6 supporting a movable member is linearly moved along the guide rail 8.

Figure 2A:
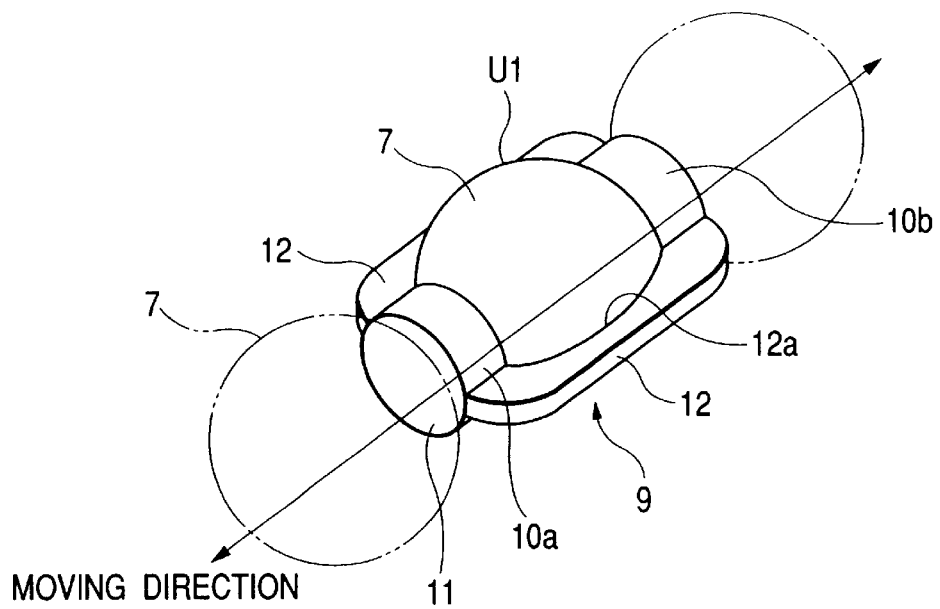
Figure 2B:
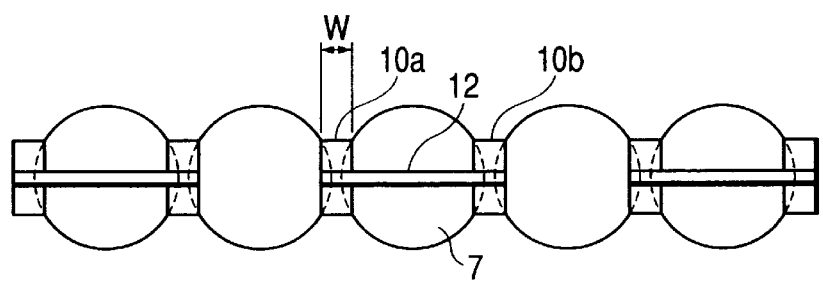
Figure 2C:
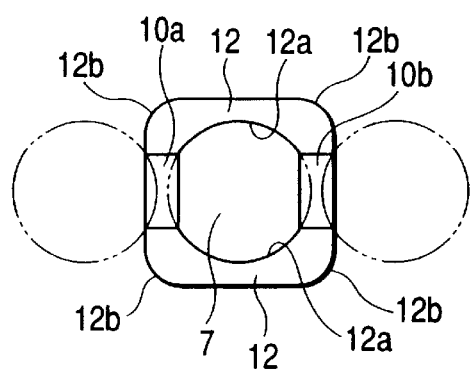

FIGS. 2A to 2C show a ball hold spacer 9 serving as a rolling-element hold spacer to be incorporated into the rectilinearly-rolling guide apparatus 5. The ball hold spacers 9 are placed such that a single ball hold spacer 9 is provided on every other ball 7 and hold, in a rotatable and sliding manner, the plurality of balls 7 rotating between the movable block 6 and the guide rail 8. Each of the ball hold spacers 9 has thick hold sections 10a and 10b, which are to be placed between the balls 7 that are arranged in a row. The thick hold sections 10a and 10b are formed so as to assume a substantially cylindrical shape. Further, the outer diameter of the thick hold section 10a and the outer diameter of the thick hold section 10b are set to be smaller than the diameter of the ball 7. A spherical indent 11 is formed in either side of the thick hold section 10a so as to correspond to the ball 7 with respect to the axial direction thereof. Similarly, the spherical indent 11 is formed in either side of the thick hold section 10b so as to correspond to the ball 7 with respect to the axial direction thereof. The spherical indent 11 is formed as a curved-surface indent whose curvature radius is substantially identical with the radius of the ball 7. When the ball hold spacer 9 is placed between the balls 7, the axis of the thick hold section 10a and the axis of the thick hold section 10b are brought into line with an extension of an imaginary line interconnecting the centers of the balls 7. As shown in FIG. 2B, the axial width of the thick hold section 10a and the axial width of the thick hold section 10b are set to a small value, as indicated by W, thus shortening the distance between the balls 7. An oil reservoir hole may be formed in the center of the spherical indent 11 as a lubricant hold section which penetrates the thick hold sections 10a and 10b in the axial direction.

A thick hold section pair which comprises the thick hold sections 10a and 10b and is placed so as to sandwich the ball 7 therebetween is formed by interconnecting the thick hold sections 10a and 10b by means of strip-shaped thin bent sections 12. The thin bent section 12 has a uniform thickness and interconnects one side surface of the thick hold section 10a and the corresponding side surface of the thick hold section 10b while extending across the ball 7 placed therebetween. The portion of the thin bent section 12 which is to interfere with the ball 7 is formed into a recessed section 12a whose curvature radius is substantially equal to the radius of the ball 7. Corners formed on the opposite longitudinal ends of the thin bent section 12 are formed into round corners 12b (see FIG. 2C). The thin bent sections 12 are placed on opposite sides of the ball 7 so as to constitute a single plane. The thick hold sections 10a and 10b and the thin bent section 12 are formed integrally from synthetic resin or a like material by means of injection molding.

Figure 3A:
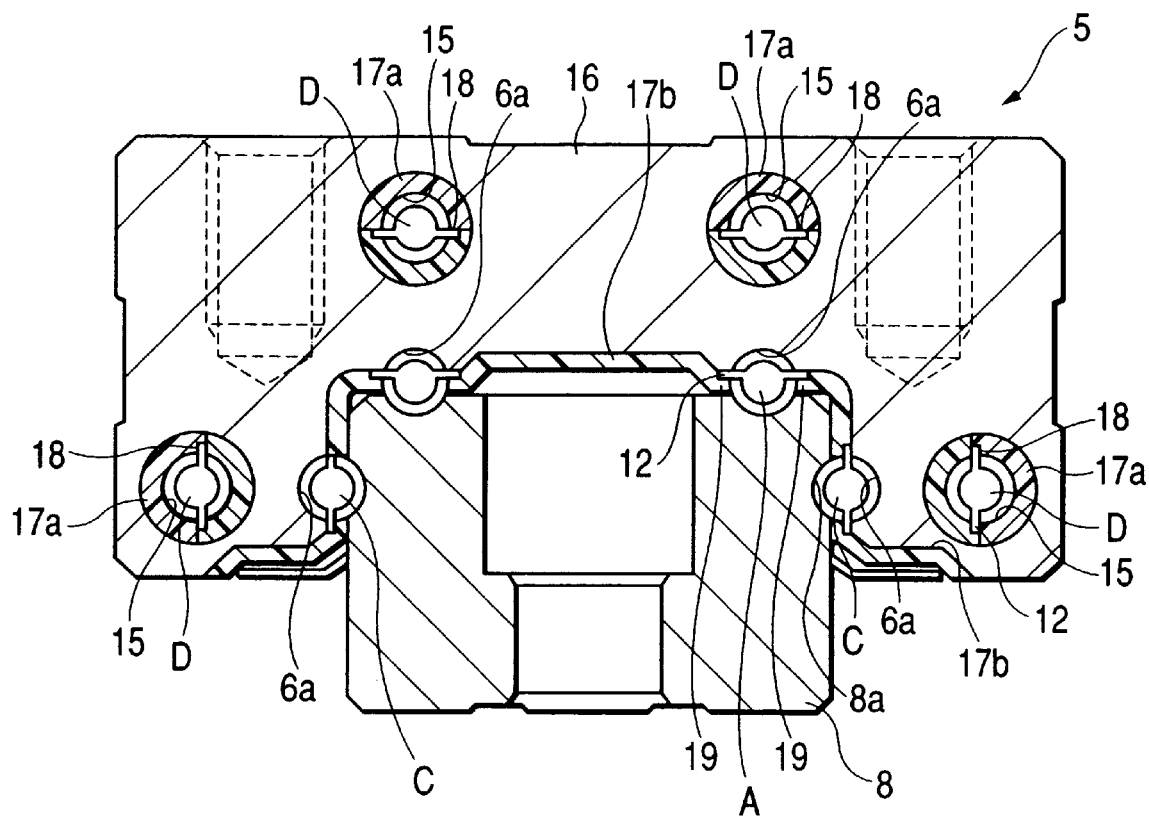

As shown in FIGS. 1 and 3, the guide rail 8 has an elongated shape and a substantially-rectangular cross section. As mentioned above, the ball travel groove 8a, acting as a track along which the balls 7 roll, is formed on either longitudinal side of the guide rail 8 so as to extend over the entire length of the guide rail 8. Although the illustrated guide rail 8 has a linear geometry, two ball travel grooves 8a are formed in either side of the guide rail 8 (i.e., a total of four ball travel grooves 8a are formed), the number of ball travel grooves may be changed variously according to the purpose of the rectilinearly-rolling guide apparatus 5.

The movable block 6 is substantially constituted by connecting a movable main unit 13 to a pair of side covers 14 provided on the opposite ends thereof, by means of bolts. Four load travel grooves 6a are formed in the movable main unit 13 so as to correspond to the respective ball travel grooves 8a. Four load travel channels C are formed between the guide rail 8 and the movable block 6, by combination of the load travel grooves 6a and the ball travel grooves 8a. Four return channels D-which extend in parallel with the load travel channels C-and change-of-direction channels for connecting the return channels D with the load travel channels C are formed in the movable block 6. A single ball circulation path is formed by combination of the load travel channel C, the return channel D, and the direction-of-change channel interconnecting the load travel channel C and the return channel D.

As shown in FIG. 3, the movable main unit 13 comprises a main unit block 16 and molded bodies 17a and 17b. The main unit block 16 is a highly-ridge structural body which is formed from steel or like material so as to be able to bear the load imposed on the movable block 6. Screw holes are formed in the upper surface of the main unit block 16 for securing an object which is to be guided by the rectilinearly-rolling guide apparatus 5. The molded bodies 7a and 7b are molded integrally with the main unit block 16 by means of injecting resin melt into a mold in which the main unit block 16 is placed; that is, by means of a so-called insert molding technique. The molded bodies 17a and 17b may be formed by means of die-cast molding while metal, such as aluminum, is used in place of resin. Further, the movable main unit 13 may be assembled not only by means of insert molding but also by means of assembly of the main unit block 16 and the molded bodies 17a and 17b, which are formed separately. Alternatively, the main unit block 16 and the molded bodies 17a and 17b may be formed integrally with each other by means of metal injection molding (MIM).

Figure 3B:
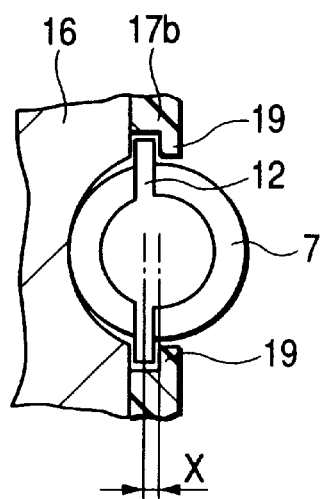
Figure 3C:
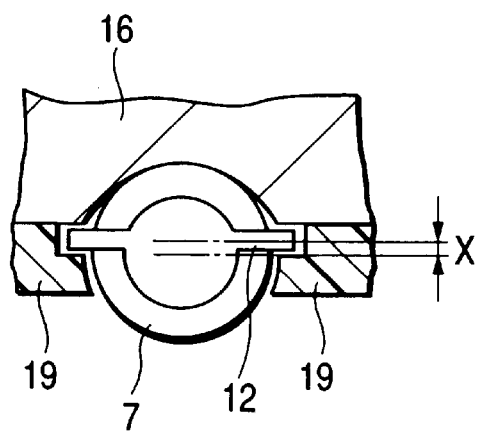
Figure 4:
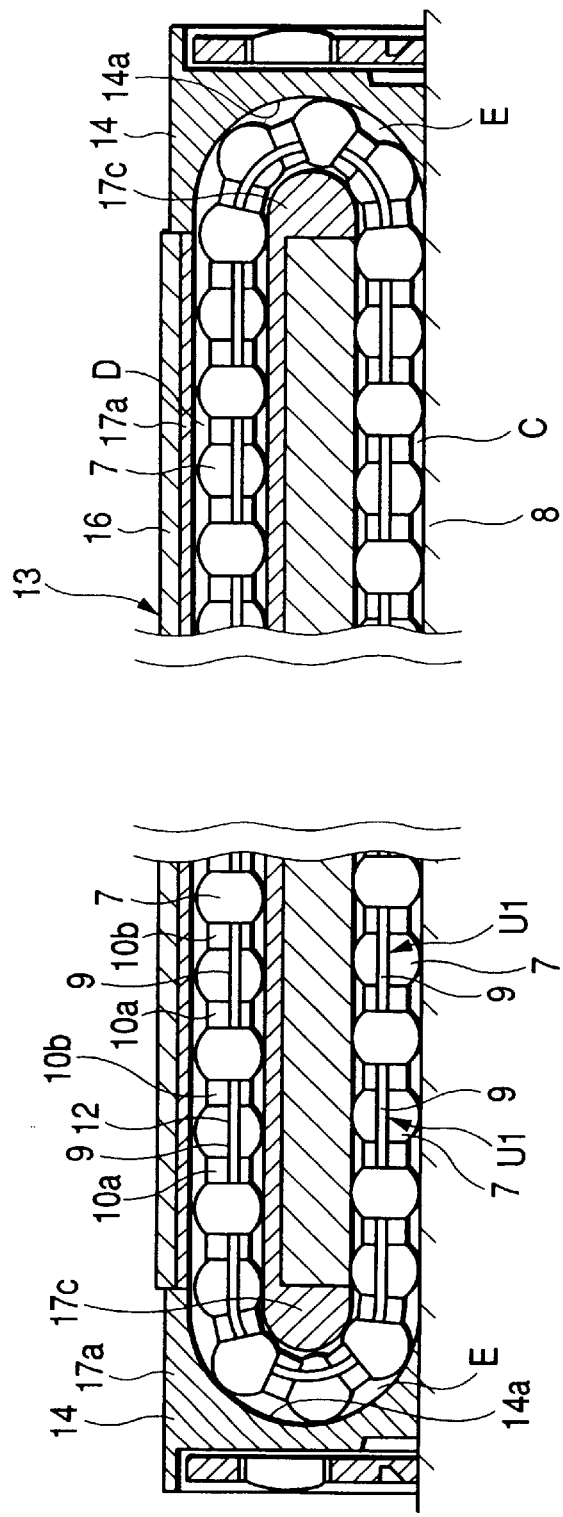
FIG. 4 is a cross-sectional view which is taken in the axial direction of the rail and shows circulation of balls within a ball circulation path.

As shown in FIGS. 3 and 4, the above-mentioned load travel grooves 6a are formed in the main unit block 6, and the return channels D are formed in the molded body 17a. Four through holes extending in parallel with the load travel channels 6a are formed in the main unit block 16. Tube-like sections of the molded body 17a are formed integrally with the through holes. The return channel D for returning the balls 7 and a guide grove 18 for guiding the thin bent sections 12 are formed in the tube-like section of the molded body 17a. A pair of ball hold sections 19 are formed in each of the areas of the molded body 17b opposing the load travel channels C such that the load travel channel 6a is interposed between the ball hold section pair 19. When the movable block 6 is removed from the guide rail 8, the ball hold section pair 19 prevents dislodging of the balls 7 from the load travel channels C. The thin bent sections 12 are guided through the space defined between the ball hold section pairs 19 and the main unit block 16 (see FIGS. 3B and 3C).

In the ball circulation path constituted of the load travel channel C, the change-of-direction channel E, and the return channel D, the width of the guide groove 18 for guiding the thin bent section 12 is maintained at a constant width slightly greater than the thickness of the thin bent section 12. The horizontal center of the guide groove 18 is displaced toward the main unit block 16 from the horizontal center of track along which the balls 7 travel, by only X. As a result, the curvature radius of the change-of-direction section of the ball circulation path can be made small, thus making the rectilinearly-rolling guide apparatus 5 compact.

As shown in FIG. 4, each of the molded bodies 17a comprises arch-shaped inner radius sections 17c which protrude from the opposite ends of the main unit block 16. In each pf the side covers 14, there are formed outer radius sections 14a, each of which constitutes the change-of-direction channels E together with the inner radius section 17c formed in the corresponding molded body 17a. When the side covers 14 are attached to the main unit block 16, the inner radius guide section 17c and the outer radius guide section 14c in combination constitute the change-of-direction channel E. Further, as a result of combination of the inner radius guide section 17c with the outer radius guide section 14c, the guide groove 8 for guiding the thin bent sections 12 is also formed in the change-of-direction channel E.

The ball 7 is fitted into the space defined between the thick hold sections 10a and 10b of the ball hold spacer 9, thus forming one unit U1 (see FIGS. 2A and 4). At this time, the ball 7 is held in the ball hold spacer 9 so as to be freely rotatable. The units U1 and the balls 7 are alternately inserted into the ball circulation path while the thin bent sections 12 of the ball hold spacer 9 are fitted into the guide groove 18. In association with the movable block 6 traveling along the guide rail 8, the balls 7 travel the load travel channel C from one end to the other end thereof while undergoing the load imposed by the movable block 6. Subsequently, the balls 7 enter one of the change-of-direction channels E and are guided to the return channel D. The balls 7 are then returned to one end of the load travel channel C by way of the other change-of-direction channel E. Since the thin bent section 12 of the ball hold spacer 9 is moved along the ball circulation path along a track defined by the guide groove 18, the balls 7 held in the ball hold spacers 9 are orderly circulated in the ball circulation path without involving a snaking action.

As mentioned above, the ball hold spacer 9 is placed in every other ball 7, and the ball 7 is held in the space of the thick hold sections 10a and 10b which forms a pair. The ball 7 which is not held in the ball hold spacer 9 is retained between the adjacent ball hold spacers 9 such that one side of the ball 7 is in contact with either the thick hold section 10a or 10b of one adjacent ball hold spacer 9 and the other side of the same is in contact with a thick hold section of another adjacent ball hold spacer 9 which is to oppose the thick hold section 10a or 10b of the one adjacent ball hold spacer 9. As mentioned above, so long as the ball hold spacer 9 is placed in every other ball 7, all the balls 7 are eventually retained by the ball hold spacers 9. Consequently, the number of the ball hold spacers 9 can be reduced to one-half the balls 7. More specifically, the number of ball hold spacers 9 to be inserted into the ball circulation path is reduced, and the number of balls 7 can be increased correspondingly. Consequently, the load-carrying capacity of the rectilinearly-rolling guide apparatus 5 can be increased. Further, the ball 7 is retained between the spherical indent 11 formed in the thick hold section 10a and the spherical indent 11 of the thick hold section 10b, thus reducing the contact pressure developing between the ball hold spacer 9 and the ball 7. As a result, there is reduced a collision sound, which would arise during the circulation of the balls 7, whereby the balls 7 are circulated smoothly.

The thin bent section 12 is set to have a uniform thickness in the traveling direction thereof, and the width of the guide groove 18 for guiding the thin bent section 12 is set to be slightly greater than the thickness of the thin bent section 12. Accordingly, the ball hold spacers 9 are guided stably without occurrence of pitching. In the change-of-direction section E, the guide groove 18 for guiding the thin bent section 12 is also curved into a circular-arc shape in parallel with the change-of-direction channel E. Therefore, the thin bent sections 12 are also moved on a curved path along the guide groove 18, and a clearance can be formed between the ball 7 and the thick hold sections 10a and 10b in the change-of-direction channel E. Lubricant enters the clearance, thus sufficiently lubricating the balls 7.

In the rectilinearly-rolling guide apparatus 5 of the present embodiment, the ball hold spacers 9 change direction two-dimensionally at the time of circulation of the balls 7. More specifically, the direction of the ball hold spacers 9 is changed by way of the route comprising the linear load travel channel C, the U-shaped change-of-direction channel E, the linear return channel D, and the U-shaped change-of-direction channel. As is evident from FIG. 4, since the thin bent section 12 of the ball hold spacer 9 is freely bent, smooth circulation of the balls 7 is ensured.

Although in the present embodiment the movable block 6 performs linear movement relative to the guide rail 8, the present invention can also be applied to and is suitable for use with a guide apparatus configured so as to cause curved relative movement.

Figure 5A:
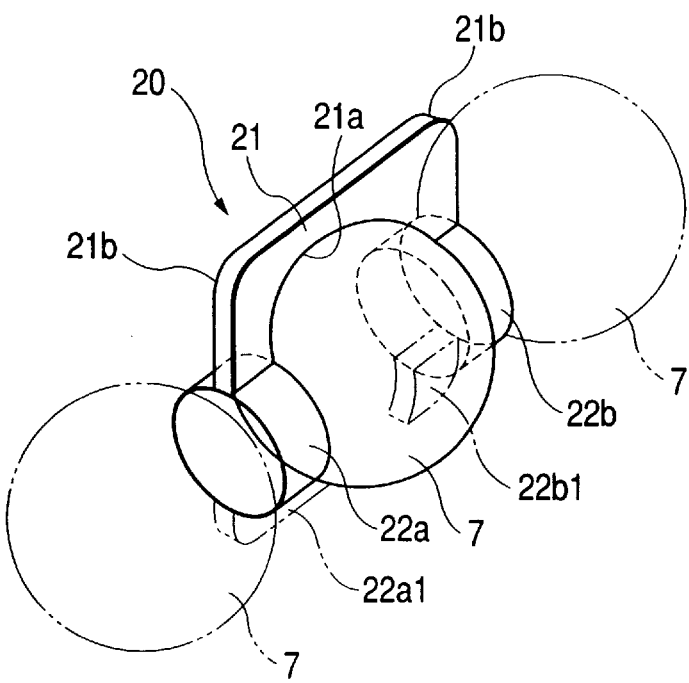
Figure 5B:
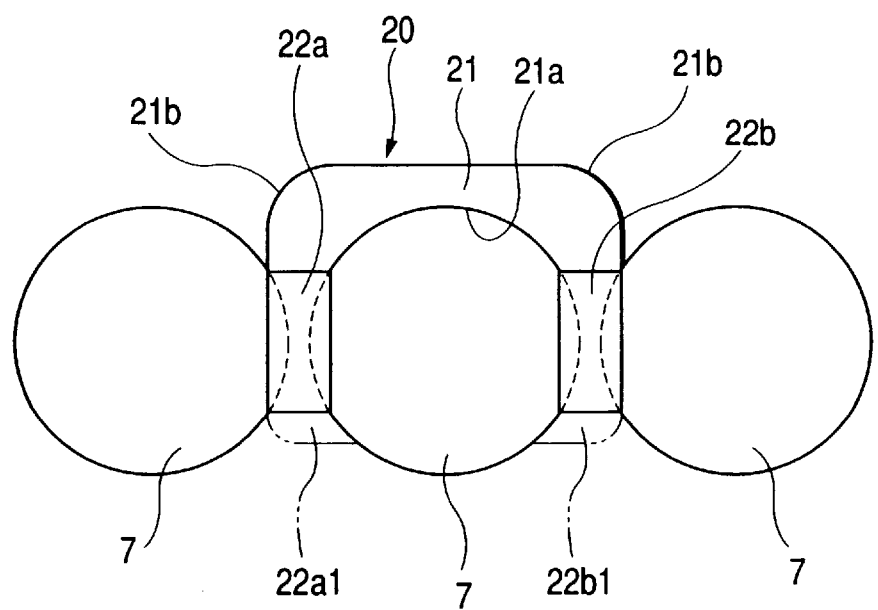

FIG. 5 shows a ball hold spacer 20 according to a second embodiment of the present invention. The ball hold spacer 20 is formed from the same material as that from which the ball hold spacer 9 of the first embodiment is formed. Even with regard to configuration, the ball hold spacer 20 is placed between the balls 7 aligned in a row in the same manner as is the ball hold spacer 9. Further, the ball hold spacer 20 has thick hold sections 22a and 22b, as in the case of the ball hold spacer 9. The thick hold sections 22a and 22b are formed into a substantially cylindrical shape, and the outer diameter of the thick hold sections 22a and 22b is set to be smaller than the diameter of the ball 7. A spherical indent 23 is formed so as to correspond to the ball 7 in either side of the thick hold section 22a with respect to its axial direction. The spherical indent 23 is formed so as to correspond to the ball 7 in either A side of the thick hold section 22b with respect to its axial direction. The spherical indent 23 has a curvature radius substantially equal to the radius of the ball 7. The thickness of the thick hold section 22a and the thickness of the thick hold section 22b with respect to the axial direction thereof are set to be a small value, thus shortening the distance between the balls 7 (see FIG. 5B). The thick hold sections 22a and 22b, which constitute a pair, are interconnected by means of a strip-shaped thin bent section 21. In comparison with the ball hold spacer 9 of the first embodiment, the ball hold spacer 20 of the second embodiment has a single thin bent section 21 provided on only one side of the ball 7. The thin bent section 21 has a uniform thickness and interconnects the side surface of the thick hold section 22a and the side surface of the thick hold section 22b. A notch 21a whose curvature radius is substantially equal to the radius of the ball 7 is formed in an area of the thin bent section 21 which would interfere with the ball 7. Further, either longitudinal end of the thin bent section 21 is rounded into a round corner 21b.

As shown in FIG. 5, an overhanging section 22a is provided in an area on the side surface of the thick hold section 22a opposite to the side surface where the end of the thin hold section 21 is attached, with respect to the diameter of the thick hold section 22a. Similarly, an overhanging section 22b is provided in an area on the side surface of the thick hold section 22b opposite to the side surface where the end of the thin hold section 21 is attached, with respect to the diameter of the thick hold section 22b. The overhanging sections 22a and 22b extend outwardly. Such a configuration ensures holding of the ball 7 even when there is used only the single thin bent section 21.

Figure 6A:
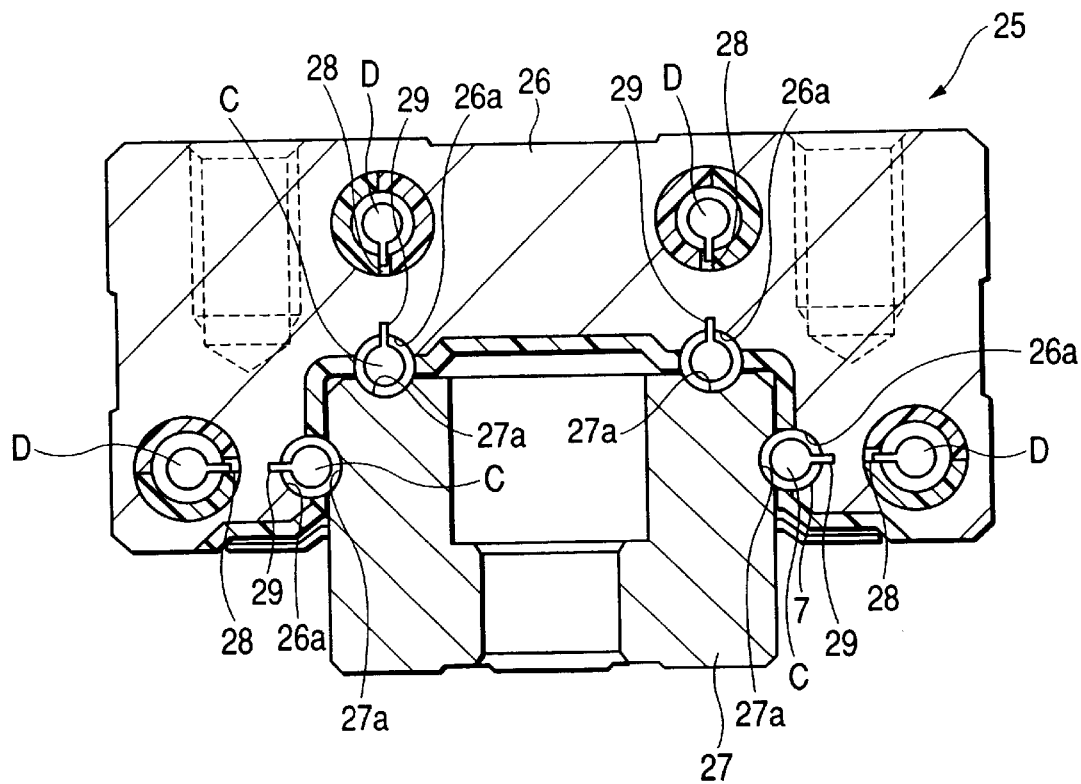
Figure 6B:
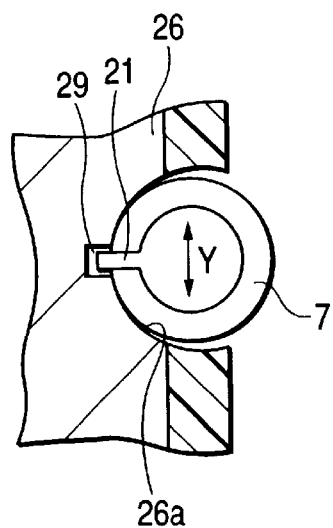
Figure 6C:
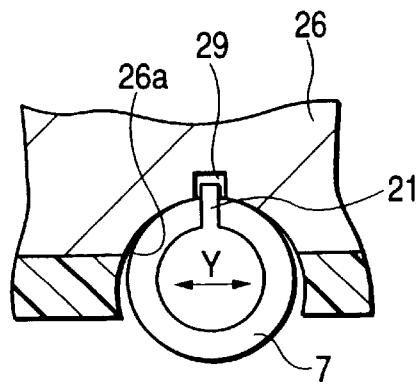

FIG. 6 shows a rectilinearly-rolling guide apparatus 25 having incorporated therein the ball hold spacer 20 of the second embodiment. Even in the rectilinearly-rolling guide apparatus 25, a movable block 26 is supported on a guide rail 27 by way of the plurality of balls 7. A total of four ball travel channels 27a along which the balls 7 will travel are formed in the guide rail 27 so as to extend over the entire length thereof; specifically, two ball travel channels 27a being formed in the upper surface of the guide rail 27 and one ball travel channel 27a being formed in either side of the same.

Four load travel channels 26a are formed in the movable block 26 so as to correspond to the respective ball travel channels 27a. The load travel channels 26a and the ball travel channels 27a in combination constitute four load travel channels C between the movable block 26 and the guide rail 27. Further, a guide groove 28 for guiding the thin bent section 21 is formed in each of the load travel channels 26a (see FIGS. 6B and 6C). The width of the guide groove 29 is set to be slightly greater than the thickness of the thin bent section 21.

Four through-holes are formed in the movable block 26 so as to extend in parallel with the load travel channels 26a, and a tube-like section of a molded body is formed integrally with each of the through-holes. The return channel D for returning the balls 7 and the guide groove 28 for guiding the thin bent section 21 are formed within the tube-like section. The width of the guide channel 28 is also set to be slightly greater than the thickness of the thin bent section 21. The guide grooves 28 and 29 are formed in only the inner radius side of the ball circulation path.

The thin bent section 21 has a strip-shaped profile and is set to have a uniform thickness in the traveling direction thereof, and the width of the guide groove 18 for guiding the thin bent section 21 is set to be slightly greater than the thickness of the thin bent section 21. Accordingly, the ball hold spacers 20 are guided stably without occurrence of pitching. Further, the thin bent section 21 is provided on only one side of the ball 7, thus enabling free bent of the ball hold spacer 20. Accordingly, the ball hold spacers 20 and the balls 7 are smoothly circulated not only when the ball hold spacers 20 and the balls 7 are circulated along a two-dimensionally-warped change-of-direction channel but also when the ball hold spacers 20 and the balls 7 are circulated along a threedimensionally-warped change-of-direction channel. Such a configuration is suitable for use with a twisted circulation path or a circulation path involving a sharp change in direction; for example, a ball screw and a nut thereof. As in the case of the ball hold spacer 9 of the first embodiment, in a case where the thin bent section 12 is provided on either side of the ball 7, the balls 7 are held stably, and the life of the ball hold spacer 20 becomes longer. Further, in a case where the radius of the cross section of the ball travel channel 26a is set to be greater than the radius of the ball 7, the balls 7 that are being circulated may cause a swinging action in the widthwise direction of the ball travel channel 26a (in direction Y shown in FIGS. 6B and 6C). In this case, since the guide grooves 28 and 29 are formed in along the inner radius side of the circulation path, the thin bent section 21 is prevented from undergoing repeated expanding and contracting action. Thus, the thin bent section 21 can be prevented from being susceptible to fatigue.

Figure 7:
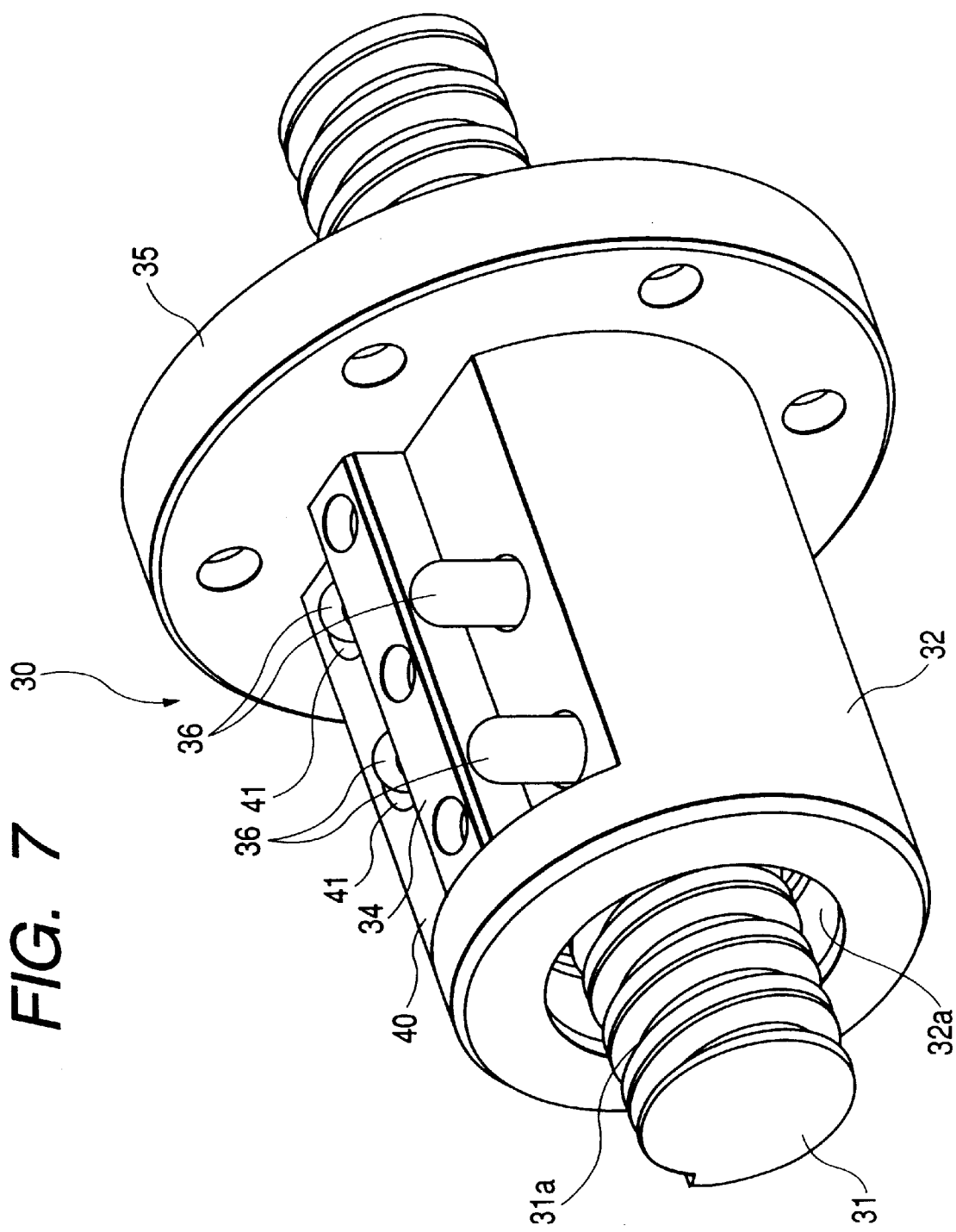
FIG. 7 is a perspective view showing a ball screw having incorporated therein the ball hold spacer of the second embodiment.
Figure 8:
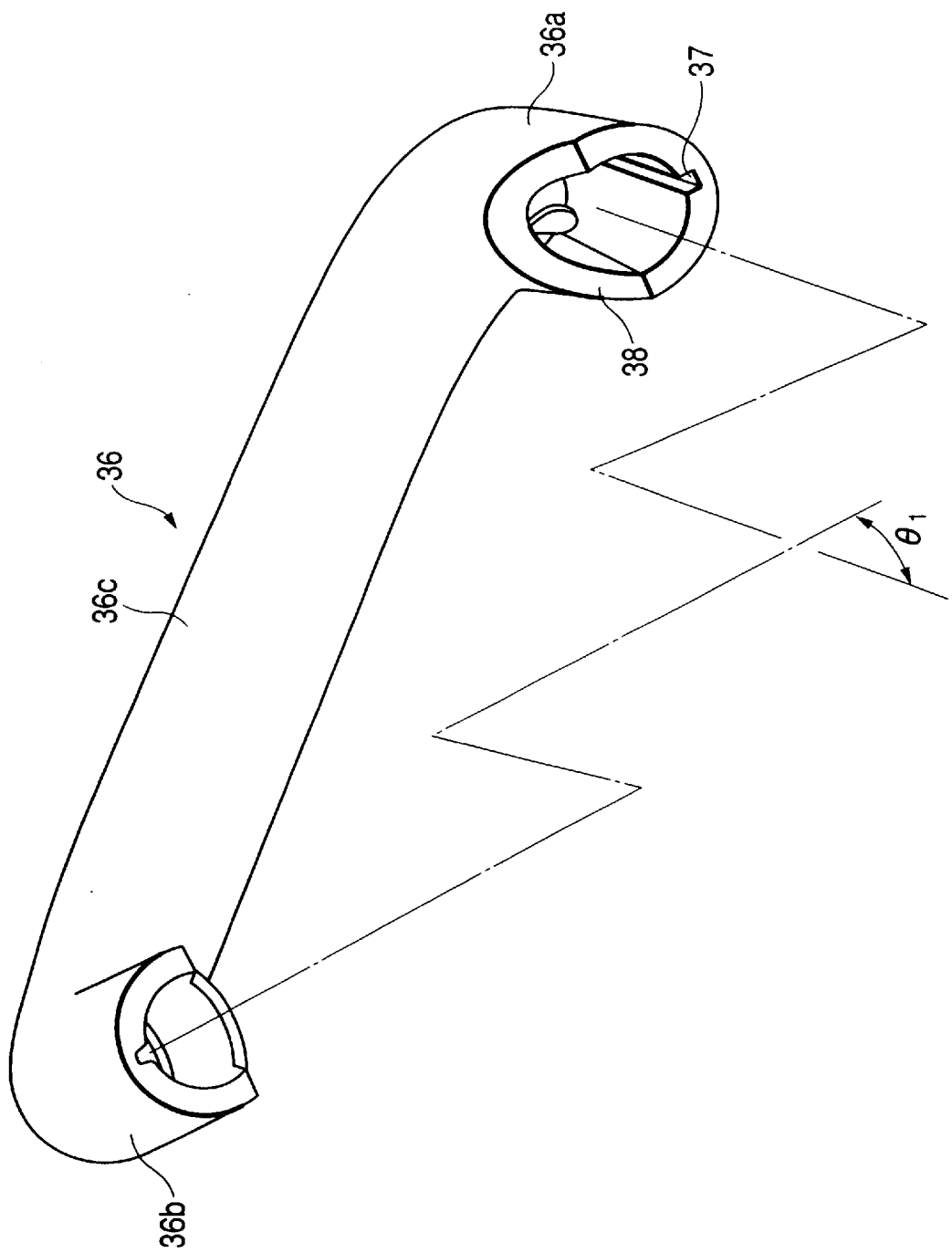
FIG. 8 is a perspective view showing a return pipe provided in the ball screw shown in FIG. 7.

FIG. 7 shows a ball screw 30 having incorporated therein the ball hold spacers 20 of the second embodiment. The ball screw 30 comprises a screw shaft 31 (corresponding to a "track spindle"), a nut member 32 (corresponding to a "slide member"), and a plurality of balls. A ball travel channel 31a serving as a rolling-element travel surface is helically formed in the exterior circumferential surface of the screw shaft,31. A ball circulation path (corresponding to a "rolling-element circulation path") is formed in the interior circumferential surface of the nut member 32 so as to include a load travel channel 32a which serves as a load travel surface and is helically formed so as to correspond to the ball travel channel 31a. The nut member 32 is attached to the screw shaft 31 so as to be able to cause movement relative thereto. The balls serve as rolling elements and are circulated through the ball circulation path in association with the relative movement (rotation) arising in between the screw shaft 31 and the nut member 32. The load travel channel of the ball circulation path is defined between the ball travel channel 31a of the screw shaft 31 and the load travel channel 32a of the nut member 32. The nut member 32 has two return pipes 36, and the return pipe 36 constitutes a no-load return channel which connects one end and the other end of the load travel channel. As shown in FIGS. 8 and 9, either end of the return pipe 36 is folded toward the screw shaft 31, and both ends of the return pipe 36 are fitted into the load travel channel so as to be spaced at several pitches apart from each other. Further, the return pipes 36 are secured to the nut member 32 by means of a pipe presser 34 (see FIG. 7).

The ball travel channel 31a formed in the screw shaft 31 is formed so as to assume; for example, a circular-arc cross section, by means of grinding or rolling.

As shown in FIG. 7, the main unit of the nut member 32 has a substantially cylindrical shape, and a flange 35 to be connected to a corresponding component is provided at one end of the nut member 32. A flat-face section 40 is foamed in the nut member 32 by removal of a portion of the exterior circumference of the nut member 32 by means of machining. Four return pipe fitting holes 41 are formed in the flat-face section 40, and the respective ends of the return pipes 36 are fitted into the return pipe fitting holes 41. The return pipe fitting hole 41 extends to the inside of the load travel channel 32a.

As is evident from FIG. 8, the return pipe 36 has a circular cross section, and either end portion of the return pipe 36 is bent at an angle of about 90° with respect to the nut member 32. Specifically, the return pipe 36 is formed into a substantially arch-shaped form and comprises a pair of legs 36a and 36b and a horizontal portion 36c interconnecting the legs 36a and 36b. As illustrated in the drawing, the legs 36a and 36b are not in parallel with each other and are twisted so as to form a torsional angle θ1 (which changes in accordance with a lead angle). A guide groove 37 is formed in the interior surface of the return pipe 36 so as to extend in the axial direction and over the entire length of the return pipe 36. The width of the guide groove 37 is set to be slightly greater than the thickness of the thin bent section 21. Both ends of the return pipe 36; that is, the legs 36a and 36b, are obliquely cut into cuts 38. The width of the cut 38 is gradually narrower with respect to the depthwise direction of the return pipe 36.

FIG. 9 shows the balls 7 and the ball hold spacers 20, which are to be inserted into the load travel channel and the return pipes 36. This drawing shows only the ball hold spacers 20 which can be viewed in cross section, and the other rolling-element hold spacers are omitted from the drawing. The ball hold spacer 20 is placed in every other balls 7, and the ball 7 is retained in one thick hold section pair comprising the thick hold sections 10a and 10b. The ball 7 that is not housed in the ball hold spacer 20 is held between the thick hold sections 10a and 10b of the adjacent ball hold spacers 20 which mutually oppose. So long as the spherical indent 23 of the ball hold spacer 20 is formed so that the ball hold spacers 20 and the balls 7 can be arranged in substantially an annular pattern, there can be prevented application of undue force to the ball hold spacers 20 and the balls 7, which would otherwise be caused during circulation of the ball hold spacers 20 and the balls 7.

As shown in FIG. 9, a guide groove 33 to be used for guiding the thin bent section 21 of the ball hold spacer 20 is formed in a ball travel channel 32a of a nut member 32. The guide groove 33 is helically formed so as to run along the ball travel channel 32a of the nut member 32, and the width of the guide groove 33 is set to be slightly greater than the thickness of the thin bent section 21. Further, the guide groove 33 is formed so as to protrude outward from a row of balls 7 arranged in an annular pattern.

FIG. 10 shows a change in the cross-sectional shape of each of the legs 36a and 36b of the return pipe 36. Reference numeral 0 designates the cross-sectional view of the tip end of the leg, and cross-sectional views designated by reference numerals 1 through 9 are taken progressively toward a deeper and inner portion of the return pipe 36. As illustrated in the drawing, in the cross-sectional view designated by 0, the cross section of each of the legs 36a and 36b assumes a substantially semi-circular shape whose both ends slightly exceed beyond the center line D by only size "h." The cross-section of each of the legs 36a and 36b becomes closer to a circular cross section toward a deeper and inner portion of the return pipe 36 (i.e., when the ball 7 travels from position 1 to position 10), and distance W between the inner edges of the cuts 38 becomes gradually smaller. In the cross-sectional views designated by 0 through 4, the distance W between the cuts 38 is greater than the diameter of the ball 7. Thus, the ball 7 is not raised by the cuts 38 and can be rolled around the screw shaft 31. However, when the ball 7 travels from position 0 to position 4, a clearance 39 formed between the interior surface of each of the legs 36a and 36b and the surface of the ball 7 opposing the interior surface becomes slightly greater. When the ball 7 travels further upward to position 5, the opposite ends of the ball 7 start to be raised by the cuts 38. Since the distance W between the cuts 38 is gradually smaller toward an inner and deeper portion of the return pipe 36, the ball 7 is guided by the cuts 38 from position 6 to position 10 and is introduced into the return pipe 36 having a circular cross section.

As shown in FIG. 9, when the screw shaft 31 is rotated, the balls 7 which are rolled under load along the inside of the ball travel channel 31a in the circumferential direction are raised by the tip end of the leg 36a. The thus-raised balls 7 pass through the return pipe 36 and return to the ball travel channel 31a from the leg 36b which is spaced several pitches apart from the leg 36a. When the screw shaft 31 is rotated reversely, the balls 7 are circulated along the above-described path in a reverse direction. The balls 7 are circulated in the same manner in a case where the nut member 32 is rotated while the screw shaft 31 is secured.

The load travel channel of the ball screw 30 is helically formed, as mentioned previously. Further, the return pipe 36 changes the direction of the balls 7 which are raised by the tip end of the return pipe 36. As has been described by reference to FIG. 8, the return pipe 36 is twisted with respect to the traveling direction of the ball 7 (at torsional angle θ1). In the ball screw 30, the balls 7 and the ball hold spacers 20 three-dimensionally change direction and move in a complicated manner.

The ball hold spacer 20 is optimal for performing such a complicated movement.

Figure 11A:
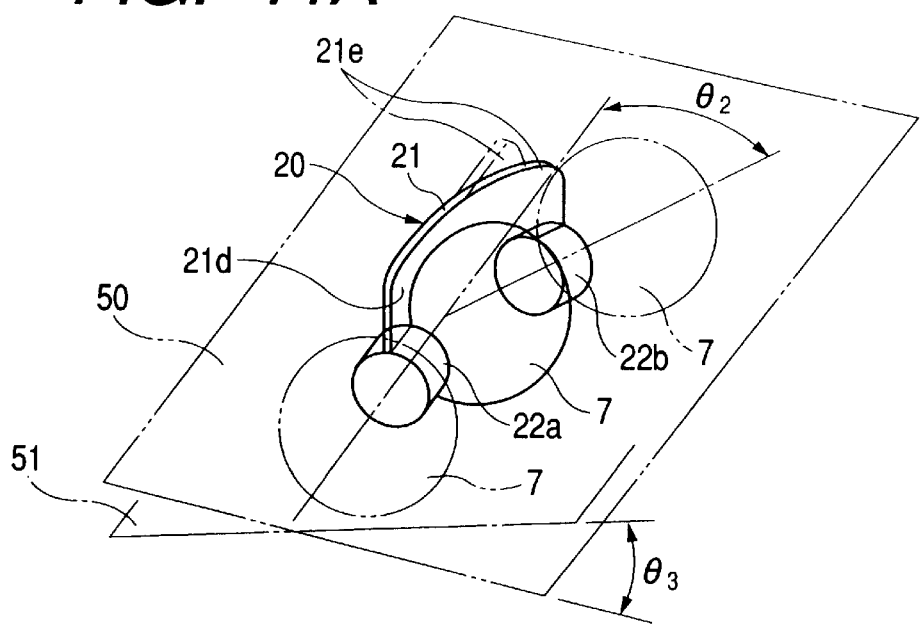

As shown in FIG. 11A, the thin bent section 21 of the ball hold spacer 20 can be considerably, freely bent within a virtual plane 50 extending in the thicknesswise direction of the thin bent section 21. In the drawing, an angle through which the thin bent section 21 can be bent is designated by θ2. Further, the thin bent section 21 can also be bent slightly in the direction perpendicular to the virtual plane 50 and can be twisted with respect to the traveling direction of the ball hold spacer 20. In the drawing, in a case where a front end section 21d of the thin bent section 21 with respect to the traveling direction thereof is at right angles to the virtual plane 50, reference symbol θ3 designates an angle formed between the virtual plane 50 and a virtual plane 51 to which a rear end section 21e of the thin bent section 21 with respect the traveling direction thereof is at right angles.

Figure 11B:
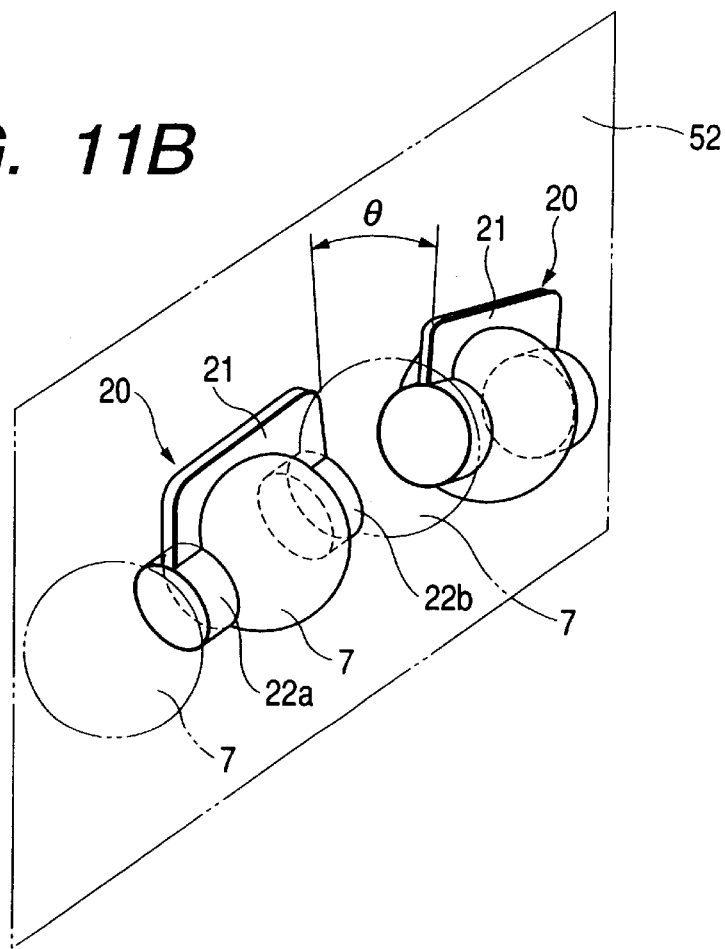

As shown in FIG. 11B, the ball hold spacers 20 that are consecutively arranged are separated from one another and are not continuous. The ball hold spacers 20 are pivotable relative to one another within a virtual plane 52 perpendicular to the virtual plane 50. In the drawing, a relative pivotable angle between the ball hold spacers 20 is designated by θ4. In a case where the rolling element corresponds to a ball, the ball hold spacers 20 are pivotable relative to one another in every direction within the virtual plane 52. In a case where the rolling element corresponds to a roller, the ball hold spacers 20 can be pivotable within only the virtual plane 52, and a limitation is imposed on the mutual pivotable movement of the ball hold spacers 20 in another direction.

By means of flexible and twisting action of the thin blade section 21 as well as of mutual pivotal movement between the ball hold spacers 20, the ball hold spacers 20 and the balls 7 freely change direction three-dimensionally, thus enabling complicated movement such as that required by the ball screw 30 of the second embodiment. Such flexible and twisting action of the thin bent section 21 and the mutual pivotal movement between the ball hold spacers are also achieved by the ball hold spacer 9 of the first embodiment shown in FIGS. 1 through 4.

Figure 12:
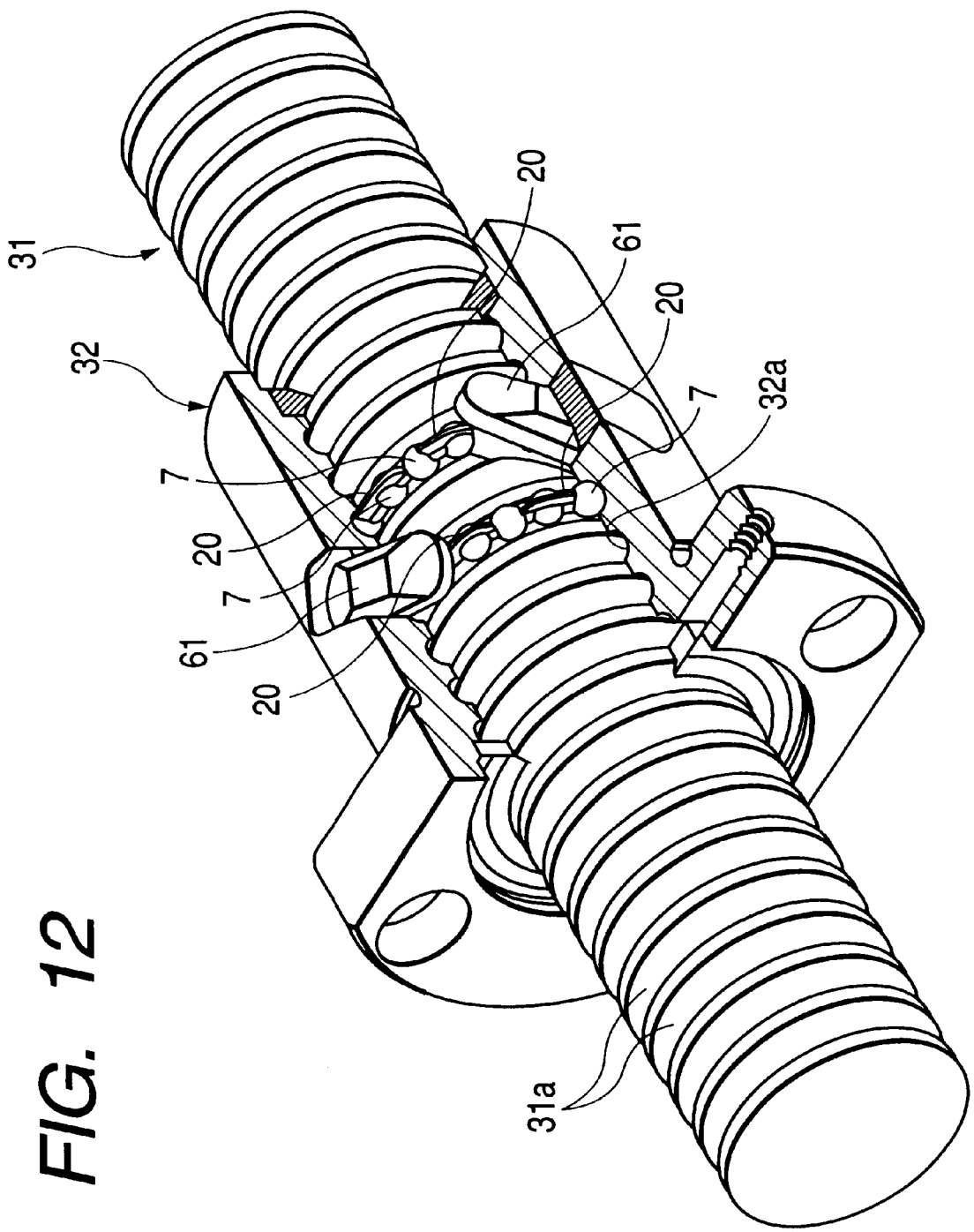
FIG. 12 is a perspective view including a partial cross section of a ball screw of deflector type to which the ball hold spacer of the present invention is applied.
Figure 13:
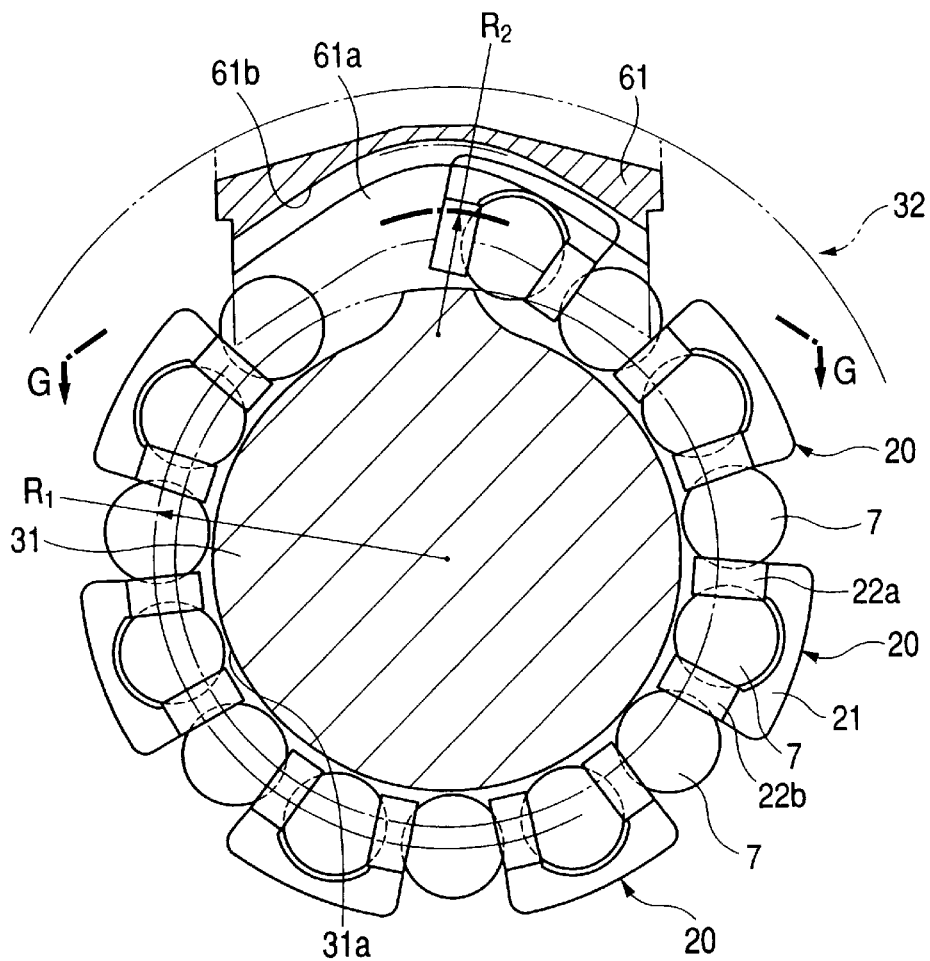
FIG. 13 is a cross-sectional view which shows the principal section of the ball screw shown in FIG. 12 and is taken in the direction perpendicular to the axial direction of a screw shaft.
Figure 14:
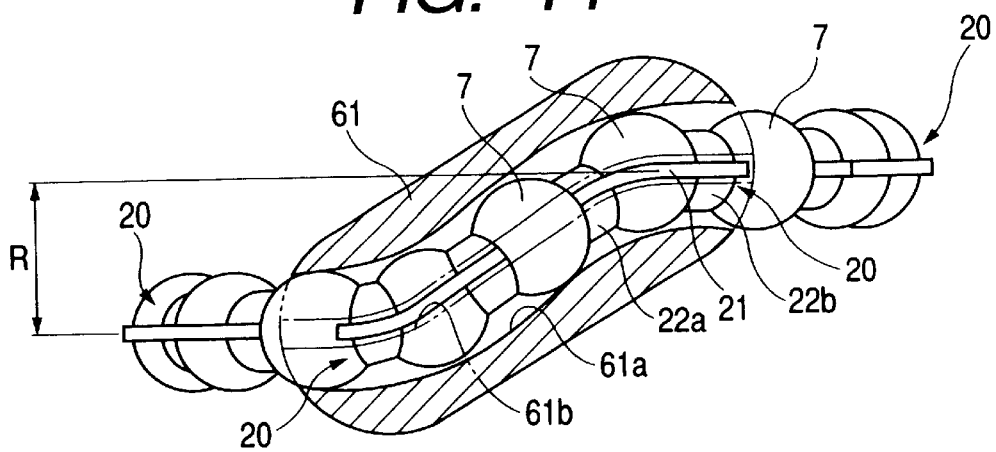
FIG. 14 is an illustration of the ball screw when viewed in direction G—G shown in FIG. 13.
Figure 15:
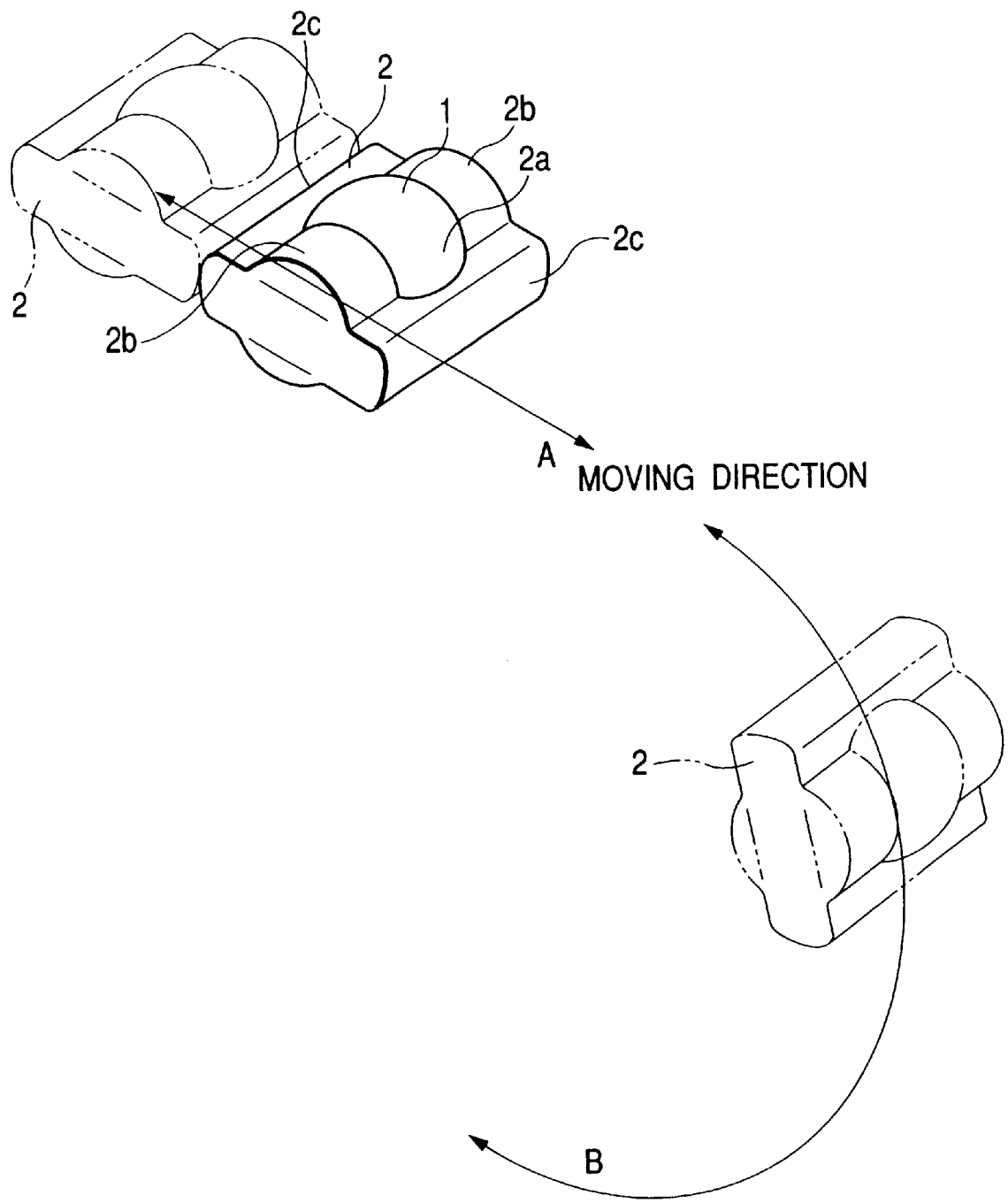
FIG. 15 is a perspective view showing a single retainer which serves as a known rolling-element hold spacer.

When the thin bent section 21 is bent, there can be formed a clearance between the ball 7 and the thick hold sections 22a and 22b. Lubricant enters the clearance, thus sufficiently lubricating the balls 7. In the embodiment relating to the ball screw 30, the balls 7 that are rolling over the ball travel channel 31a of the screw shaft 31 are raised through use of the return pipe 36 and returned to a position spaced several pitches away from the position where the balls 7 have been raised. As shown in FIGS. 12 through 14, in another conceivable configuration, a deflector 61 for raising the balls 7 is provided on the nut member 32. The balls 7 which are rolling over the ball travel channel 31a of the screw shaft 31 are departed from the ball travel channel 31a by the deflector 61. The thus-departed balls 7 run beyond the outer diameter section of the screw shaft 31 and go back to the ball travel channel 31a by a lead angle. Although not illustrated in the drawing, there may also be employed a ball screw of so-called side cover type. Specifically, the nut member 32 comprises a nut body having formed therein a ball travel channel 32a and side covers attached to the respective ends of the nut body. The ball travel channel 32a and a communication channel interconnecting the return channels are formed in each of the side covers.

The ball screw equipped with the deflector 61 will now be described in detail by reference to FIGS. 12 through 14. As shown in FIGS. 13 through 14, a substantially S-shaped ball return channel 61a is formed in the deflector 61, and a guide channel 61b for guiding the thin bent section 21 of the ball hold spacer 20 is longitudinally formed in the center of the ball return channel 61a. In order to enable the balls 7 which have entered the ball return channel 61a to go beyond the outer circumference of the screw shaft 31, the ball return channel 61a has the deepest recess that is formed at the longitudinal center of the deflector 61.

In the ball screw of the present embodiment, when relative rotation arises between the screw shaft 31 and the nut member 32, the balls 7 and the ball hold spacers 20 are circulated through the ball circulation path defined in the nut member 32. Next will be described in detail the configuration of the ball circulation path and the balls 7 and the ball hold spacers 20, which are circulated in the ball circulation path.

Although the ball circulation path is formed in a substantially annular pattern so as to surround the screw shaft 31, the portion of the screw shaft 31 where the deflector 61 is provided bulges outwardly with respect to the radial direction of the screw shaft 31. In FIG. 13, reference symbol R1 designates the radius of a circular path along which the center of the ball 7 moves during the course of the ball 7 rolling over the ball travel channel 31a of the screw shaft 31a; and R2 designates the radius of a circular path along which the center of the ball 7 moves during the course of the ball 7 passing through a circular-arc section bulged by the deflector 61.

When passing through the ball return channel 61a of the deflector 61 in conjunction with the ball 7, the ball hold spacer 20 goes beyond the outer diameter of the screw shaft 31 along the portion of the ball circulation path which bulges in a radially outward direction. The ball hold spacer 20 travels along an S-shaped zigzag path along the ball return channel 61a and goes back to the ball travel channel 31a by only a lead angle (designated by reference symbol R shown in FIG. 14) With respect to the axial direction of the screw shaft 31. As a result, the ball 7 and the ball hold spacer 20 go back to the ball travel channel 31a by one turn and are circulated around the screw shaft 31.

In FIG. 13, since the ball hold spacers 20 are mutually pivotable, the ball hold spacers 20 travel so as to well follow the balls 7 when the balls 7 roll such that their centers travel from radius R1 to radius R2. The thin bent section 21 of the ball hold spacer 20 is flexibly bent in the thicknesswise direction. Even in a case where the ball hold spacer 20 is guided along the S-shaped path within the deflector 61 shown in FIG. 14; that is, a case where the ball hold spacer 20 changes direction so as to have a point of inflection, the ball hold spacer 20 can smoothly pass the guide. As mentioned above, by means of free bent (and twisting action) of the thin bent section 21 and the mutual pivotal movement between the ball hold spacers 20, the ball hold spacers 20 and the balls can freely change direction three-dimensionally, thus enabling complicated movement such as that required in the present embodiment.

Even when the present invention is applied to the previously-described ball screw of side cover type, there is yielded the same advantage as that mentioned above.

The ball hold spacers 9 and 20 of the present invention can not be limited to a rectilinearly-rolling guide apparatus or a ball screw but can be applied to a ball spline machine. The term "ball spline machine" refers to a machine comprising a spline shaft serving as a track member and an outer casing which serves as a slide member and is movably attached to the spline shaft by way of a plurality of balls. Although in the previous embodiments balls are used as rolling elements, rollers can also be employed.

As has been described above, the present invention provides a rolling-element hold spacer including: a thick hold section having spherical indents formed on both sides thereof, said thick hold sections being adapted to be interposed between rolling elements so that the spherical indents match the curved surface of the rolling elements; and thin bent sections for interconnecting only one thick hold section pair in which the rolling element is to be interposed.

Even in a case where a rolling-element circulation path requires three-dimensional change in direction, the thin bent section is flexibly deflected. Further, the rolling-element hold spacers which are adjacent to each other with a single rolling element interposed therebetween mutually perform pivotal movement around the rolling element, thereby enabling smooth circulation of the rolling elements. Clearance arises between the rolling element and the thick hold sections as a result of bent of the thin bent section. Lubricant enters the clearance, to thereby sufficiently lubricate the rolling elements. So long as the rolling-element hold spacer is placed every other the rolling elements, all the rolling elements are eventually held by the rolling-element hold spacers.

Consequently, the number of rolling-element hold spacers can be reduced to one-half the number of the rolling elements. More specifically, the number of rolling-element hold spacers to be inserted into the rolling-element circulation path is reduced, and the number of rolling elements can be increased correspondingly. As a result, the load-carrying capacity of a rectilinearly-movable apparatus employing the rolling-element hold spacers can be increased. Further, the thick hold sections of the rolling-element hold spacer hold the rolling element by way of the spherical indents, and hence a contact pressure developing between the rolling-element hold spacer and the rolling element can be diminished.

Accordingly, there can be prevented generation of a collision sound, which would arise during the circulation of the rolling elements, thus enabling smooth circulation of the rolling elements. The thin bent section interconnecting the thick hold sections has a strip shape and a uniform thickness in the traveling direction of the rolling-element hold spacer. So long as the width of a guide groove formed in the slide member for the purpose of guiding the thin bent section is set to be slightly greater than the thickness of the thin bent section, the rolling-element hold spacer is stably guided without involvement of a pitching problem, thus ensuring smooth circulation of the rolling elements.

What is claim is:

1. A rolling-element hold spacer comprising:

a thick hold section having spherical indents formed on both sides thereof, said thick hold sections being adapted to be interposed between rolling elements so that the spherical indents match the curved surface of the rolling elements; and thin bent sections for interconnecting only one thick hold section pair in which the rolling element is to be interposed.

2. The rolling-element hold spacer as defined in claim 1, wherein said thin bent sections are provided on both sides of the rolling element.

3. The rolling-element hold spacer as defined in claim 1, wherein said thin bent sections are disposed on only one side of the rolling element.

4. The rolling-element hold spacer as defined in claim 1, wherein said thick hold section is substantially circular.

5. The rolling-element hold spacer as defined in claim 1, wherein the outer diameter of said thick hold section is smaller than the diameter of the rolling element.

6. A rectilinearly-movable apparatus comprising:

a track shaft having rolling-element travel surfaces;

a slide member having load travel surfaces corresponding to the rolling-element travel surfaces and attached to said track shaft so as to freely perform movement relative thereto;

a plurality of rolling elements arranged and housed in the rolling-element travel circulation path and are circulated in association with the movement of said slide member relative to said track shaft; and a plurality of rolling-element hold spacers, each of which rotatively holds each of the rolling elements;

wherein said rolling-element hold spacer comprises a thick hold section having spherical indents formed on both sides thereof, said thick hold sections being adapted to be interposed between rolling elements so that the spherical indents match the curved surface of the rolling elements; and thin bent sections for interconnecting only one thick hold section pair in which the rolling element is to be interposed.

* * * * *